United States Patent
Zhao et al.

(10) Patent No.: US 9,100,872 B2
(45) Date of Patent: Aug. 4, 2015

(54) MECHANISMS FOR EVOLVED PACKET SYSTEM QUALITY OF SERVICE CLASS IDENTIFIER EXTENSION

(75) Inventors: Xiaoming Zhao, Plano, TX (US); Claude Jean-Frederic Arzelier, Cannes (FR)

(73) Assignee: BlackBerry Limited, Waterloo, Ontario (CA)

(*) Notice: Subject to any disclaimer, the term of this patent is extended or adjusted under 35 U.S.C. 154(b) by 501 days.

(21) Appl. No.: 12/762,205

(22) Filed: Apr. 16, 2010

(65) Prior Publication Data

US 2010/0265823 A1 Oct. 21, 2010

Related U.S. Application Data

(60) Provisional application No. 61/170,527, filed on Apr. 17, 2009.

(51) Int. Cl.
*H04W 28/12* (2009.01)
*H04W 28/24* (2009.01)

(52) U.S. Cl.
CPC .............. *H04W 28/12* (2013.01); *H04W 28/24* (2013.01)

(58) Field of Classification Search
None
See application file for complete search history.

(56) References Cited

U.S. PATENT DOCUMENTS

| | | | | |
|---|---|---|---|---|
| 5,892,754 | A * | 4/1999 | Kompella et al. | 370/236 |
| 7,539,777 | B1 * | 5/2009 | Aitken | 709/248 |
| 7,660,282 | B2 * | 2/2010 | Sarkar | 370/331 |
| 2002/0181395 | A1 * | 12/2002 | Foster et al. | 370/229 |
| 2003/0214905 | A1 * | 11/2003 | Solomon et al. | 370/229 |
| 2005/0169171 | A1 * | 8/2005 | Cheng et al. | 370/229 |
| 2008/0002608 | A1 * | 1/2008 | Zheng et al. | 370/328 |
| 2009/0103546 | A1 * | 4/2009 | Kafka et al. | 370/395.5 |
| 2010/0165940 | A1 * | 7/2010 | Watfa et al. | 370/329 |
| 2010/0172239 | A1 * | 7/2010 | Corliano et al. | 370/230 |

FOREIGN PATENT DOCUMENTS

| | | |
|---|---|---|
| GB | 2399716 A | 9/2004 |
| JP | 200312228 A | 11/2000 |
| WO | 2007110568 A1 | 10/2007 |
| WO | 2009141016 A1 | 11/2009 |

OTHER PUBLICATIONS

3GPP TS 24.301 v8.0.0; 3rd Generation Partnership Project; Technical Specification Group Core Network and Terminals; Non-Access-Stratum (NAS) Protocol for Evolved Packet System (EPS); Stage 3; Release 8; Dec. 2008; 221 pgs.

(Continued)

*Primary Examiner* — Gregory Sefcheck
*Assistant Examiner* — Daniel Mitchell
(74) *Attorney, Agent, or Firm* — Conley Rose, P.C.; J. Robert Brown, Jr.

(57) ABSTRACT

A method to promote connectivity between a user agent (UA) and a packet data network (PDN) is provided. The method comprises determining a quality of service class identifier (QCI) to associate with a service data flow, determining a sense of change in at least one of a priority, a packet delay budget, and a packet error loss rate of the QCI to associate with the service data flow, and sending a request to establish a service data flow treatment, the request comprising the QCI and a QCI extension encapsulating the sense of change of the QCI.

4 Claims, 3 Drawing Sheets

(56) References Cited

OTHER PUBLICATIONS

3GPP TS 23.402 v8.2.0; 3rd Generation Partnership Project; Technical Specification Group Services and System Aspects; Architecture Enhancements for Non-3GPP Accesses; Release 8; Jun. 2008; 181 pgs.
3GPP TS 23.401 v8.2.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 8; Jun. 2008; 182 pgs.
3GPP TS 23.203 v7.9.0; 3rd Generation Partnership Project; Technical Specification Group Services and System Aspects; Policy and Charging Control Architecture; Release 7; Dec. 2008; 74 pgs.
PCT International Preliminary Report on Patentability; PCT Application No. PCT/US2010/031493; Jun. 6, 2011; 8 pages.
3GPP TS 23.203 V9.0.0; Policy and Charging Control Architecture; 3rd Generation Partnership Project; Technical Specification Group Services and System Aspects; Release 9; Mar. 2009; 113 pages.
Ekstrom, Hannes; "QoS Control in the 3GPP Evolved Packet System"; IEEE Communications Magazine; Feb. 2009; 8 pages.
Ludwig, Reiner, et al.; "An Evolved 3GPP QoS Concept"; IEEE; 2006; 5 pages.
Japanese Office Action; Application No. 2012-505987; Feb. 21, 2013; 9 pages.
Korean Office Action; Application No. 10-2011-7027130; Jan. 30, 2013; 6 pages.
3GPP TS 23.107 V9.0.0; 3rd Generation Partnership Project; Technical Specification Group Services and System Aspects; Quality of Service (QoS) Concept and Architecture; Release 9; Dec. 2009; 40 pages.
3GPP TS 23.203 V9.4.0; 3rd Generation Partnership Project; Technical Specification Group Services and System Aspects; Policy and Charging Control Architecture; Release 9; Mar. 2010; 123 pages.
3GPP TS 24.008 V9.2.0; 3rd Generation Partnership Project; Technical Specification Group Core Network and Terminals; Mobile Radio Interface Layer 3 Specification; Core Network Protocols; Stage 3; Release 9; Mar. 2010; 605 pages.
3GPP TS 36.300 V9.2.0 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 9; Dec. 2009; 178 pages.
3GPP TSG SA WG2 Meeting #71; "Handling of Unrecognized QCIs"; S2-090959; Budapest, Hungary; Feb. 16-20, 2009; 2 pages.
3GPP TSG-SA WG2 Meeting #71; "Future QCI Values"; S2-090872; Budapest, Hungary; Feb. 16-20, 2009; 5 pages.
3GPP TSG-SA WG2 Meeting #71; "Mapping of Unrecognized QCIs"; S2-090867; Budapest, Hungary; Feb. 16-20, 2009; 4 pages.
Korean Office Action; Application No. 10-2011-7027130; Aug. 29, 2013; 7 pages.
Chinese Office Action; Application No. 201080026804.9; Apr. 16, 2014; 10 pages.
Canadian Office Action; Application No. 2,759,023; Nov. 22, 2013; 3 pages.
Chinese Office Action; Application No. 201080026804.9; Nov. 13, 2013; 21 pages.
Canadian Office Action; Application No. 2,759,023; Feb. 2, 2015; 4 pages.

* cited by examiner

MECHANISMS FOR EVOLVED PACKET SYSTEM QUALITY OF SERVICE CLASS IDENTIFIER EXTENSION

CROSS-REFERENCE TO RELATED APPLICATIONS

The present application claims priority to U.S. provisional patent application No. 61/170,527 filed Apr. 17, 2009, by Xiaoming Zhao, et al, entitled "Mechanisms For Evolved Packet System Quality of Service Class Identifier Extension", which is incorporated by reference herein as if reproduced in its entirety.

BACKGROUND

As used herein, the terms "user agent" and "UA" can refer to mobile devices such as mobile telephones, personal digital assistants, handheld or laptop computers, and similar devices that have telecommunications capabilities. Such a UA might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. The term "UA" may also refer to devices that have similar capabilities but that are not transportable, such as fixed line telephones, desktop computers, set-top boxes, or network nodes and therefore may also be referred to as user equipment "UE". When a UA is a network node, the network node could act on behalf of another function such as a wireless device or a fixed line device and simulate or emulate the wireless device or fixed line device. For example, for some wireless devices, the IP (Internet Protocol) Multimedia Subsystem (IMS) Session Initiation Protocol (SIP) client that would typically reside on the device actually resides in the network and relays SIP message information to the device using optimized protocols. In other words, some functions that were traditionally carried out by a wireless device can be distributed in the form of a remote UA, where the remote UA represents the wireless device in the network. The term "UA" can also refer to any hardware or software component that can terminate a SIP session.

In traditional wireless telecommunications systems, transmission equipment in a base station transmits signals throughout a geographical region known as a cell. As technology has evolved, more advanced equipment has been introduced that can provide services that were not possible previously. This advanced equipment might include, for example, an enhanced node B (ENB) rather than a base station or other systems and devices that are more highly evolved than the equivalent equipment in a traditional wireless telecommunications system. Such advanced or next generation equipment may be referred to herein as long-term evolution (LTE) equipment, and a packet-based network such as the Evolved Packet Core (EPC) that uses such equipment can be referred to as an evolved packet system (EPS). As used herein, the term "access device" will refer to any component, such as a traditional base station, an LTE ENB, or other such devices that can provide a UA with access to other components in a telecommunications system.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a system and method for extending a quality of service class identifier (QCI) designation from a set of specified scalar values is disclosed. A QCI is used as a reference to access node-specific parameters that control bearer level packet forwarding treatment (e.g. scheduling weights, admission thresholds, queue management thresholds, link layer protocol configuration, etc.), and that have been pre-configured by the operator. The disclosed extended QCI is backwards compatible and also promotes converting from the extended QCI to the specified scalar values of QCI. In an embodiment, the extended QCI comprises a first component designating one of the set of scalar QCI values and a second component designating attribute value change(s) of QCI relative to the scalar QCI designated by the first component, for example an increase in a packet delay budget by a predefined amount.

Figure 1:
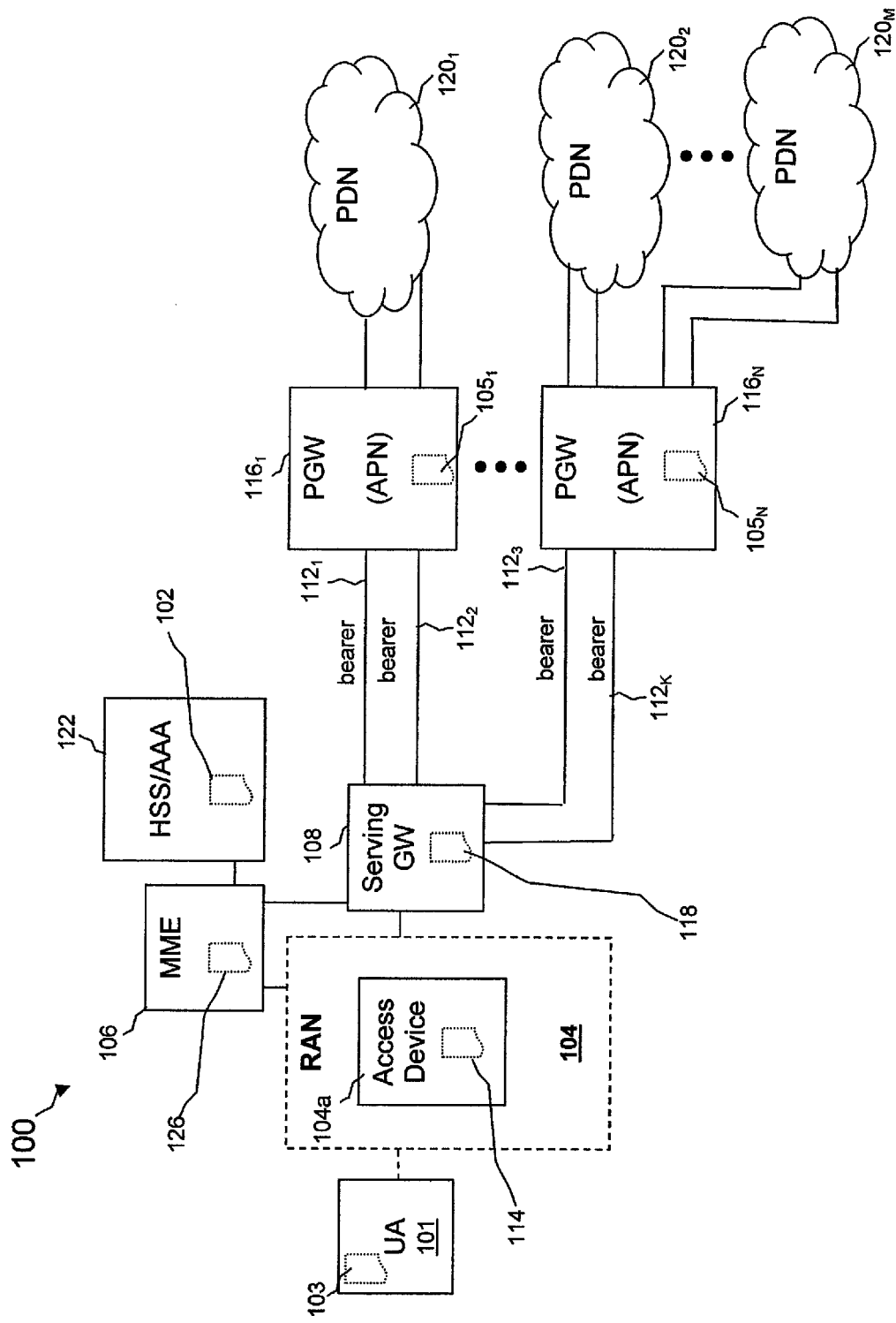
FIG. 1 is an illustration of a telecommunications system according to an embodiment of the disclosure.

Referring to FIG. 1, illustrated is an embodiment of a telecommunications system 100. FIG. 1 is exemplary and may have other components or arrangements in other embodiments. In an embodiment, the system 100 might be or include an evolved packet system (EPS). The system 100 includes a RAN (radio access network) 104 using 3GPP LTE or perhaps other technologies. Internet protocols (IP) IPV4, IPV6, GTP, and/or other current or future protocols may be supported by these technologies. In addition, the RAN 104 may be serviced by any or a combination of Internet Protocol-based networks, packet-based networks, public switched telecom networks (PSTN), and/or integrated services digital networks.

The RAN 104 includes an access network device 104a, such as an evolved Node B, or other network components. In an embodiment, the RAN 104 is in communication with an EPS mobility management entity (MME) 106. The MME 106 is in communication with a serving gateway 108 which communicates through bearers $112_{1-K}$ or signaling connections to packet data gateways (PGWs) $116_{1-N}$. In an embodiment, the PGWs $116_{1-N}$ are associated with access point names (APN). Each of the PGWs $116_{1-N}$ are connected to one or more packet data network(s) (PDN) $120_{1-M}$ which might include non guaranteed bit rate (non-GBR) packet based services such as World Wide Web pages, email and instant messaging services, and other data packet-based services.

It should be noted that the lines connecting the elements in FIG. 1 can represent bearer connections, signaling connections, or both. Traditionally, a different style of line may be used in a drawing to represent each type of connection. However, for the sake of clarity, bearer connections and signaling connections are both represented by solid lines in FIG. 1. The dashed line connecting the UA 101 to the RAN 104 is intended to represent the fact that the UA 101 might be connected to the RAN 104 at a first time and connected to other systems at other times.

As described above, the present proposals relate to extended QCI designations related to (1) resource type as guaranteed bit rate (GBR) and non guaranteed bit rate (non-GBR), (2) priority, (3) packet delay budget (PDB), and (4) packet error loss rate (PELR). In some contexts, the resource type, priority, PDB, and PELR may be referred to as quality of service (QoS) characteristics or attributes. The extended QCI may be provided by the UA 101 when connecting to the PDN 120. The QoS characteristics associated with the extended QCI may be enforced at various locations in the network by various components in the network. For example, in communication with the RAN 104 is a user agent (UA) 101. In an embodiment, the RAN 104 connects to a radio access cell by which the RAN 104 provides services to the UA 101 via a radio interface.

The PGWs $116_{1-N}$, the serving gateway 108, the RAN 104 and the UA 101 may include the associated QCI parameter for each of the GBR or non-GBR bearers for bearer level packet data forwarding treatment according to the 4 characteristics specified by the QCI. The subscribed QCI parameters are stored in HSS/AAA 122 as part of the UE subscribed QoS Profile. The QCIs stored in HSS/AAA 122 are accessed by the MME 106 and delivered to the different network elements 116, 108, 104 or 101 or other devices within the system 100. The QCI parameters can also be modified/updated by the UE 101 and the other network element in the system 100. In an embodiment, the QCI may be stored as a first QCI parameter or parameters 103 in the UA 101, a second QCI parameter or parameters 114 stored in the SGW 108, a third QCI parameter or parameters 126 stored in the MME 106, a fourth QCI parameter or parameters 102 stored in the HSS/AAA 122, and a firth QCI parameter or parameters 105 stored in the PGW 116.

In some instances, the UA 101 may connect to a plurality of PGWs $116_{1-N}$ and the PDNs $120_{1-M}$ concurrently via for example the access device 104a, the serving gateway 108, and the plurality of bearer connections $112_{1-K}$. Based on the UA's 101 QCI parameter 103, each of the bearers $112_{1-K}$ may conform to a set of quality of service requirements.

The home subscriber server (HSS) or an authentication, authorization and accounting (AAA) server 122 stores policy and tracking/location/routing information for subscribers to a wireless telecommunications service. In an embodiment, the HSS/AAA server 122, or a similar component, can connect to the MME 106 and can store data related to services available to the UA 101, quality of service (QoS) policies for the UA 101, and other similar UA profile data. If dynamic policy and charge control (PCC) rules are to be deployed in the system 100, a policy control and charging rules function (PCRF) (not shown), or a similar component, might be present.

It is contemplated that the QCI may be defined in one version of a standard to comprise nine scalar QCI values as indicated in Table 1 below.

TABLE 1

| QCI | Resource Type | Priority | PDB | PELR |
| --- | --- | --- | --- | --- |
| 1 | GBR | 2 | 100 ms | $10^{-2}$ |
| 2 | GBR | 4 | 150 ms | $10^{-3}$ |
| 3 | GBR | 3 | 50 ms | $10^{-3}$ |
| 4 | GBR | 5 | 300 ms | $10^{-6}$ |
| 5 | Non-GBR | 1 | 100 ms | $10^{-6}$ |
| 6 | Non-GBR | 6 | 300 ms | $10^{-6}$ |
| 7 | Non-GBR | 7 | 100 ms | $10^{-3}$ |
| 8 | Non-GBR | 8 | 300 ms | $10^{-6}$ |
| 9 | Non-GBR | 9 | 300 ms | $10^{-6}$ |

To extend the nine scalar QCI values defined above, for example to support additional performance parameters not defined in Table 1, it is contemplated that the QCI may comprise two portions or parameters, a first portion designating one of the scalar QCI values defined in Table 1 and a second portion designating a change of one or more QoS characteristics relative to the values associated with the scalar QCI value of the first portion. In an embodiment, the first portion of the QCI may comprise four bits and the second portion of the QCI may comprise four bits, but in another embodiment a different format of the first and second portions of the QCI may be employed. For a new version of standard more than nine scalar QCI values or characteristics would be defined (in Table 1 for example) and e.g. the nine QCI values defined in Table 1 belong to the first portion.

In an embodiment, if the second portion of the QCI is set to a value of zero, for example 0000 binary, the QCI may be fully described by the first portion of the QCI. In an embodiment, a value of 1000 binary in the second portion of the QCI indicates that the priority designated by the first portion of the QCI is decreased by a first defined quantity, for example by one level. In an embodiment, a value of 1001 binary in the second portion of the QCI indicates that the priority designated by the first portion of the QCI is increased by a second defined quantity, for example by one level. In an embodiment, a value of 0100 binary in the second portion of the QCI indicates that the PDB designated by the first portion of the QCI is decreased by a third defined quantity, for example by 50 ms. In an embodiment, a value of 0101 binary in the second portion of the QCI indicates that the PDB designated by the first portion of the QCI is increased by a fourth defined quantity, for example by 50 ms. In an embodiment, a value of 0010 binary in the second portion of the QCI indicates that the exponent of the PELR designated by the first portion of the QCI is decreased by a fifth defined quantity, for example by decreasing the negative exponent by 1, for example from $10^{-3}$ to $10^{-2}$. In an embodiment, a value of 0011 binary in the second portion of the QCI indicates that the exponent of the PELR designated by the first portion of the QCI is increased by a sixth defined quantity, for example by increasing the negative exponent by 1, for example from $10^{-3}$ to $10^{-4}$.

Note that a value of xxx1 binary, where 'x' designates that the associated bit position may have any value, in the second portion of the QCI is associated with increases relative to the QoS characteristics mapped by the scalar value in the first portion of the QCI while a value of xxx0 binary in the second portion of the QCI is associated with decreases relative to the QoS characteristics mapped by the scalar value in the first portion of the QCI. While the predefined values for increases and decreases in the examples above were equal, in an embodiment the predefined values for increases and decreases of the priority, the PDB, and/or the PELR need not be equal in value. In an embodiment, the predefined values associated with increases and decreases may further be based on the scalar value in the first portion of the QCI, for example, in an embodiment, different predefined values for increases and decreases for each of the priority, the PDB, and the PELR may be defined for each of the current nine different scalar QCI values. In an embodiment, the predefined values for increases and decreases associated with non-GBR resource QCIs may be different from the predefined values for increases and decreases for GBR resource QCIs.

In an embodiment, by using 7 bits for the QCI extension portion, some ranges could be defined, defining the differences to apply for one or more QCI characteristics, with a possibility not to modify some of the characteristics. An example of the coding would be as follows:

| Bits | | | | | | | | |
|---|---|---|---|---|---|---|---|---|
| 8 | 7 | 6 | 5 | 4 | 3 | 2 | 1 | |
| 0 | 0 | 0 | 0 | 0 | 0 | 0 | 0 | Value 0 |
| | | | | ... | | | | ... |
| 0 | 1 | 1 | 1 | 1 | 1 | 0 | 0 | Value 124 |

Hence, values 0 to 124 could define a change to apply to the characteristics of the reference QCI. Tables 2 and 3 below could define how those changes in characteristics are derived from values 0 to 124:

TABLE 2

QCI extended values

| | |
|---|---|
| Values 0 to 4 | A = 1; B = 1; C from 1 to 5. |
| Values 5 to 9 | A = 1; B = 2; C from 1 to 5. |
| Values 10 to 14 | A = 1; B = 3; C from 1 to 5. |
| Values 15 to 19 | A = 1; B = 4; C from 1 to 5. |
| Values 20 to 24 | A = 1; B = 5; C from 1 to 5. |
| Values 25 to 49 | Same as Values 0 to 24 with A = 2. |
| Values 50 to 76 | Same as Values 0 to 24 with A = 3. |
| Values 75 to 99 | Same as Values 0 to 24 with A = 4. |
| Values 100 to 124 | Same as Values 0 to 24 with A = 5. |

TABLE 3

Change on QCI from the QCI extended values

| | A | B | C |
|---|---|---|---|
| 1 | Priority unchanged | Packet Delay Budget unchanged | Packet Error Loss Rate unchanged |
| 2 | Priority + 1 | Packet Delay budget + 50 ms | Packet Error Loss Rate *10 |
| 3 | Priority − 1 | Packet Delay budget − 50 ms | Packet Error Loss Rate *$10^{-1}$ |
| 4 | Priority + 2 | Packet Delay budget + 100 ms | Packet Error Loss Rate *100 |
| 5 | Priority − 2 | Packet Delay budget − 100 ms | Packet Error Loss Rate *$10^{-2}$ |

In an embodiment, the second portion of the QCI may indicate a change (increase or decrease) of more than one performance characteristic. It should be noted that it could still be possible to indicate no change for some of the other performance characteristics within the QCI extension. For example, the first bit may be used to indicate a toggle of the type (GBR versus non-GBR). The next two bits in the octet may refer to the Priority characteristic (i.e. relate to the potential Priority change). The last bit in the octet could remain unused, or be used altogether with two bits of a given performance characteristic change in order to bring its coding range to three bits. In another embodiment, some specific code-points may identify some changes in the performance characteristics (with a change to more than one performance characteristic possible, and/or allowing to code no change for some of the performance characteristics). For example, by using 7 bits for the QCI extension the definition of the difference in QCI characteristics could be done by using for example two bits for the difference in Priority, two bits for the difference in PDB, two bits for the PELR, and optionally one bit for a change in resource type. As one possible example, the coding defining this could be as follows:

| 7 | 6 | 5 | 4 | 3 | 2 | 1 |
|---|---|---|---|---|---|---|
| A | B | C | D | E | F | G |

Bits A to G define a change to apply to the characteristics of the reference QCI, as follows:

| A | B | |
|---|---|---|
| 0 | 0 | Priority decremented by 2 |
| 0 | 1 | Priority decremented by 1 |
| 1 | 0 | Priority unchanged |
| 1 | 1 | Priority incremented by 1 |

In an embodiment, in order to bound the Priority to values 1 to 9, it could be specified that the values derived out of this range shall have a final value of 1 or 9 if the initial value was below or above those numbers, respectively. This could be specified for other coding choices than the one specified in this embodiment.

| C | D | |
|---|---|---|
| 0 | 0 | Packet Delay Budget decreased by 100 ms |
| 0 | 1 | Packet Delay Budget decreased by 50 ms |
| 1 | 0 | Packet Delay Budget unchanged |
| 1 | 1 | Packet Delay Budget increased by 50 ms |

In an embodiment, The Packet Delay Budget could be specified with a final minimum value. For example 25 ms, or 50 ms. This could be specified for other coding choices than the one specified in this embodiment.

| E | F | |
|---|---|---|
| 0 | 0 | Packet Error Loss Rate *$10^{-2}$ |
| 0 | 1 | Packet Error Loss Rate *$10^{-1}$ |
| 1 | 0 | Packet Error Loss Rate unchanged |
| 1 | 1 | Packet Error Loss Rate *10 |

| G | |
|---|---|
| 0 | Resource type unchanged |
| 1 | Resource type toggled between GBR/non-GBR |

In one embodiment, some code-points could be allocated within the QCI extension portion, to be used for some PLMN specific QCIs or QCI characteristics. The QCI characteristics associated with those code-points would be known within the PLMN (Network), and not coded within the standards (only the code-point itself would be allocated, to be used).

The issue with this is that, although the network would know the meaning of a given point in term of QCI characteristics (because it is applying it within the whole network, network partners, or equivalent PLMN), on the other hand the UE (device) would not know which QCI characteristics to apply when receiving this PLMN specific QCI. A way to solve this is to specify for the device that when receiving a code-point within the range of operator specific QCI, it shall consider this as specifying no difference with the reference QCI, i.e. apply the reference QCI instead.

For example, when using the example from the previous clause, the use of QCI extension, together with range for PLMN specific QCI, could give the following example as a result:

Quality of Service Class Identifier extended (QCI extended), octet 12.

| | | | Bits | | | | |
|---|---|---|---|---|---|---|---|
| 8 | 7 | 6 | 5 | 4 | 3 | 2 | 1 |
| 0 | A | B | C | D | E | F | G |
| 1 | 0 | x | x | x | x | x | x Range allocated for operator specific QCI. |

In UE to network direction and in network to UE direction:
Bits A to G define a change to apply to the characteristics of the reference QCI from octet 3, as follows:

| A | B | |
|---|---|---|
| 0 | 0 | Priority decremented by 2 |
| 0 | 1 | Priority decremented by 1 |
| 1 | 0 | Priority unchanged |
| 1 | 1 | Priority incremented by 1 |

The Priority is bounded to values 1 to 9. Hence, values derived out of this range shall have a final value of 1 or 9 if the initial value was below or above those numbers, respectively.

| C | D | |
|---|---|---|
| 0 | 0 | Packet Delay Budget decreased by 100 ms |
| 0 | 1 | Packet Delay Budget decreased by 50 ms |
| 1 | 0 | Packet Delay Budget unchanged |
| 1 | 1 | Packet Delay Budget increased by 50 ms |

The Packet Delay Budget shall have a final minimum value of 25 ms.

| E | F | |
|---|---|---|
| 0 | 0 | Packet Error Loss Rate $*10^{-2}$ |
| 0 | 1 | Packet Error Loss Rate $*10^{-1}$ |
| 1 | 0 | Packet Error Loss Rate unchanged |
| 1 | 1 | Packet Error Loss Rate $*10$ |

| G | |
|---|---|
| 0 | Resource type unchanged |
| 1 | Resource type toggled between GBR/non-GBR |

Operator specific QCI range:
In the network to UE direction, a value received within the operator specific QCI range shall be interpreted by the UE as no change in QCI characteristics, i.e. apply the QCI characteristics from octet 3.

In an embodiment, to allow a UE compliant to this version of the specifications to have a predictable UE behaviour in the future when receiving any other value that could be defined in the future, a requirement could be added so that: any other value received by the UE shall be interpreted as no change in QCI characteristics, i.e. apply the reference QCI characteristics (from octet 3 in the example). It should be noted that this could be specified also for other coding choices than the one specified in this embodiment.

In another embodiment, if we use 8 bits for QCI extension portion as an example, and use1 bit to indicate the delta change direction in each of the 3 attributes: Priority, PDB, and PELR or using the QCI extension format DP DBB, DLL where D is the increase/decrease or "1/0" indicator, then we would have "no change" or "00" and 2 delta change (+1 or "11", −1 or "01") for the Priority, "no change" or "000" or "100" and 6 delta unit changes (+1 or "101", +2 "110", +3 or "111", −1 or "001", −2 "010", −3 or "011") for both PDB and PELR. Totally we would have 3*7*7=147 change combinations. Where the unit change for PDB can be, for examples 50 ms or 25 ms. The unit change for PELR can be $10^{-1}$.

As an option, the QCI extension portion can be also defined with some fixed changes for the QoS characteristics Priority level, PDB, and PELR indexed by the QCI extension binary bits. The following are examples in which the QCI extension portion has 4 bits:

| Extension Bits | Priority | PDB Changes | PELR |
|---|---|---|---|
| 0000 | No | No | No |
| 0001 | No | No | $10^{-1}$ |
| 0010 | No | −50 ms | No |
| 0011 | No | −50 ms | $10^{-1}$ |
| 0100 | −1 | No | No |
| 0101 | −1 | No | $10^{-1}$ |
| 0110 | −1 | −50 ms | No |
| 0111 | −1 | −50 ms | $10^{-1}$ |
| 1001 | No | No | $10^{1}$ |
| 1010 | No | +50 ms | No |
| 1011 | No | +50 ms | $10^{1}$ |
| 1100 | +1 | No | No |
| 1101 | +1 | No | $10^{1}$ |
| 1110 | +1 | +50 ms | No |
| 1111 | +1 | +50 ms | $10^{1}$ |

In more general, the QCI extensions and the combination of each QCI QoS attribute variations relative to the standard QCIs in QCI portion 1 can be specified in the templates. And the index used in the QCI extension portion can be defined or calculated based on the positions of the needed characteristic changes in the templates. This is described in the following:

Let
  the number of delta changes to Priority=m (>=1), each change has index i (i=1, . . . , m)
  the number of delta changes to PDB=n (>=1), each change has index j (j=1, . . . , n)
  the number of delta changes to PELR=p (>=1), each change has index k (k=1, . . . , p)

Assuming the length the QCI extension portion F bits where $m*n*p<=2^F$. Then the QCI extension index for the QCI delta changes specified by i,j,k is QCI extension index (i,j,k)=(i−1)*(n*p)+(j−1)*p+(k−1).

Example

The following table specifies the QCI extension delta changes with m=n=p=5.

| i, j, k | Priority(i) | PDB(j) | PELR(k) |
|---|---|---|---|
| 1 | Priority unchanged | Packet Delay Budget unchanged | Packet Error Loss Rate unchanged |
| 2 | Priority + 1 | Packet Delay budget + 50 ms | Packet Error Loss Rate *10 |
| 3 | Priority − 1 | Packet Delay budget − 50 ms | Packet Error Loss Rate *$10^{-1}$ |
| 4 | Priority + 2 | Packet Delay budget + 100 ms | Packet Error Loss Rate *100 |
| 5 | Priority − 2 | Packet Delay budget − 100 ms | Packet Error Loss Rate *$10^{-2}$ |

To define the QCI extension index for delta changes of Priority+1 (i=2), PDB−100 ms (j=5) and PELR*100 (k=4), it shall have $$QCI \text{ extension index } (2, 5, 4) = (2 - 1)*(5*5) + (5 - 1)*5 + (4 - 1)$$
$$= 25 + 20 + 3 = 48 \text{ (decimal)}$$
$$\text{or } 0011\ 0000 \text{ (binary)}$$

As an extreme that $i = j = k = 1$ it shall have $$QCI \text{ extension index } (0, 0, 0) = (1 - 1)*(5*5) + (1 - 1)*5 + (1 - 1)$$
$$= 0 + 0 + 0 = 0 \text{ (decimal)}$$
$$\text{or } 0000\ 0000 \text{ (binary)}$$

As another extreme that $i = j = k = 5$ it shall have $$QCI \text{ extension index } (5, 5, 5) = (5 - 1)*(5*5) + (5 - 1)*5 + (5 - 1)$$
$$= 100 + 20 + 4 = 124 \text{ (decimal)}$$
$$\text{or } 0111\ 1100 \text{ (binary)}$$

In addition, the QCI extension mechanism above can be extended to include the resource type changes. Also when the length of QCI extension has 8 bits, it can set m=5, n=p=7 and to have totally 5*7*7=245 ($<2^{8=256}$) combinational QCI changes. Besides the delta changes to the standard QCI QoS characteristics can be specified unevenly or arbitrarily according to the operational needs. By the same methodology the standard QCIs in portion 1 can be also specified possibly with different QCI indexes.

In an embodiment, a QCI Extension indicator can be used to indicate whether this QCI belong to the standard QCI position or an extended QCI or an operator specific QCI with operator specified 4 QCI QoS attributes. If the indicator indicates that it is a standardized QCI, the values of the QCI shall be read as a scalar QCI with the corresponding default 4 attributes as in QCI portion 1. If the indicator indicates that it is an extended QCI or operator specific QCI, the values in the QCI portion and extended portion shall be read in a given format with detailed 4 attribute values: the resource type, the priority, the PDB and PELR. The following is an example if two bytes are used for this embodiment:

| The 1st QCI byte: | | | | | | | | |
|---|---|---|---|---|---|---|---|---|
| 0 | 0 | 0 | 0 | 0 | 0 | 0 | 1 | QCI 1 (bit 8 = 0, basic, $2^{nd}$ QCI byte ignored) |
| 0 | 0 | 0 | 0 | 0 | 0 | 1 | 0 | QCI 2 (bit 8 = 0, basic, $2^{nd}$ QCI byte ignored) |
| 0 | 0 | 0 | 0 | 0 | 0 | 1 | 1 | QCI 3 (bit 8 = 0, basic, $2^{nd}$ QCI byte ignored) |
| 0 | 0 | 0 | 0 | 0 | 1 | 0 | 0 | QCI 4 (bit 8 = 0, basic, $2^{nd}$ QCI byte ignored) |
| 0 | 0 | 0 | 0 | 0 | 1 | 0 | 1 | QCI 5 (bit 8 = 0, basic, $2^{nd}$ QCI byte ignored) |
| 0 | 0 | 0 | 0 | 0 | 1 | 1 | 0 | QCI 6 (bit 8 = 0, basic, $2^{nd}$ QCI byte ignored) |
| 0 | 0 | 0 | 0 | 0 | 1 | 1 | 1 | QCI 7 (bit 8 = 0, basic, $2^{nd}$ QCI byte ignored) |
| 0 | 0 | 0 | 0 | 1 | 0 | 0 | 0 | QCI 8 (bit 8 = 0, basic, $2^{nd}$ QCI byte ignored) |
| 0 | 0 | 0 | 0 | 1 | 0 | 0 | 1 | QCI 9 (bit 8 = 0, basic, $2^{nd}$ QCI byte ignored) |
| 0 | 0 | 0 | 0 | 1 | 0 | 1 | 0 | to |
| 0 | 1 | 1 | 1 | 1 | 1 | 1 | 1 | reserved for additional basic with bit 8 = 0 (totally reserved basic QCIs = $2^7$ − 10 = 118) |
| 1 | 0 | 0 | 0 | w | x | y | z | non-basic (bit 8 = 1) with bearer type = NGBR (bit 5 = 0) and priority = wxyz (1-15) |
| 1 | 0 | 0 | 1 | w | x | y | z | non-basic (bit 8 = 1) with bearer type = GBR (bit 5 = 1) and priority = wxyz (1-15) |

| QCI Extended ($2^{nd}$ QCI byte) | | | | | | | |
|---|---|---|---|---|---|---|---|
| Bits | | | | | | | |
| 8 | 7 | 6 | 5 | 4 | 3 | 2 | 1 | |
| a | b | c | b | e | f | g | h | non-basic QCI with PDB = abcd ((1-15)*50 ms and PELR = efgh ($10^{-1}$ *(1 to 15)). |

Total non-basic QCIs = $2^{13} − 1 = 8191$

A network node may determine the QCI desired for a service data flow and encode this QCI using the first portion of the QCI and the second portion of the QCI as described above. The QCI parameter 114 in RAN 104 may comprise the first portion of the QCI and the second portion of the QCI as described above. In an embodiment, if a network node, for example the serving gateway 108, is unfamiliar with the encoding mechanism employing the QCI extension described above, the network node may ignore the second portion of the QCI and treat the service data flow based on the first portion of the QCI alone. Alternatively, the RAN 104 may map the extended QCI to one of the nine values identified in Table 1 above by a least square method such that the sum of the squared errors of the non bearer type three attribute difference of the extended QCI with the corresponding three attributes of the mapped QCI value is minimized. Once converted to one of the nine scalar QCI values, the scalar QCI value may be further mapped to an earlier and/or legacy quality of service (QoS) definition, QoS parameter, and/or QoS value. In an embodiment, if an unknown QCI and/or an unknown extended QCI is received, the service data flow may be treated with the lowest priority and/or the lowest level of performance QoS characteristics. For example, in an embodiment, if the QCI and/or the extended QCI are unknown to the receiving device, network node, and/or entity, the service data flow may be treated as for a non-guaranteed bit rate, with a priority 9, with a 300 ms packet delay budget, and a $10^{-2}$ packet error/loss rate. In another embodiment, if the QCI and/or the extended QCI are unknown to the receiving device, network node, and/or entity, the service data flow may be treated as for a non-guaranteed bit rate, with a priority 9, with a 300 ms packet delay budget, and a $10^{-3}$ packet error/loss rate. In another embodiment, if the QCI and/or the extended QCI are unknown to the receiving device, network node, and/or entity, the service data flow may be treated as for a non-guaranteed bit rate, with a priority 9, with a 300 ms packet delay budget, and a $10^{-6}$ packet error/loss rate. In another embodiment, if the QCI and/or the extended QCI are unknown to the receiving device, network node, and/or entity, the request to establish a service data flow or the request to define a treatment for an existing service data flow may be rejected and/or ignored.

Figure 2:
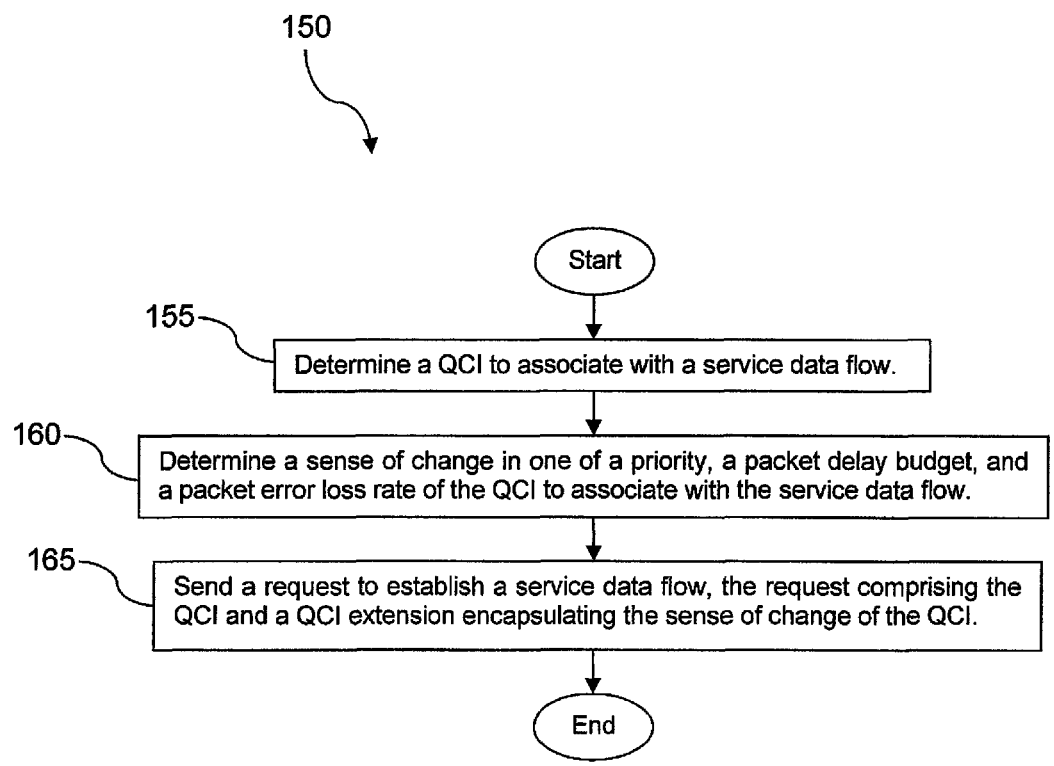
FIG. 2 is a flow chart of a method according to an embodiment of the disclosure.

Turning now to FIG. 2, a method 150 is described. At block 155, a scalar QCI value from Table 1 is determined to associate with a service data flow. The scalar QCI value may be selected to comprise the non bearer type three attributes or all the four attributes whose values most closely match to the desired QoS characteristics for the subject service data flow. At block 160, a sense of change for one of the three or four attributes—resource type (if four attributes), priority, packet delay budget (PDB), and packet error loss rate (PELR)—is determined to associate with the service data flow. At block 165, a request for the service data flow treatment is sent, for example from the UA 101, wherein the request comprises the first portion of the QCI including the scalar QCI value determined in block 155 and the second portion of the QCI that designates the desired change of the QoS characteristics from the values of the QoS characteristics identified by the scalar QCI value. In some contexts, the second portion of the QCI may be referred to as a QCI extension.

In an embodiment, the first portion of the QCI may comprise an octet in an evolved packet system (EPS) quality of service (QoS) information element and the second portion of the QCI may comprise another octet in the EPS QoS information element. For example, in an embodiment, the first portion of the QCI may comprise a third octet in the EPS QoS information element and the second portion of the QCI may comprise a twelfth octet in the EPS QoS information element. In another embodiment, however, the octet corresponding to the first portion of the QCI and the octet corresponding to the second portion of the QCI may be placed in other ordered positions within the EPS QoS information element.

As a motivating example, a GBR resource type may be desired for the service data flow. Additionally, a packet delay budget of 75 ms may be desired. At block 155, accordingly, a scalar QCI value of 3 may be determined for the first portion of the QCI. A defined change value of 25 ms may be associated with the scalar QCI value of 3. To arrive at a packet delay budget of 75 ms based on a scalar QCI value of 3, the packet delay budget associated with the scalar QCI value of 3, which is 50 ms, must be increased by 25 ms, hence the needed sense of change is increase or positive. The second portion of the QCI may be determined as 0101 binary, which indicates that the packet delay budget is to be increased by the defined increment value. In an embodiment, the QCI may be encoded as 0011 0101 binary, where 0011 binary corresponds to the first portion of the QCI, the scalar QCI value of 3, and where 0101 binary corresponds to the second portion of the QCI or the QCI extension. Those of ordinary skill in the art, in combination with the present disclosure, may readily follow this example to pursue a variety of related implementations of the extended QCI, all of which are contemplated by the present disclosure. Some other encoding pattern may be employed for the QCI extension.

Figure 3:
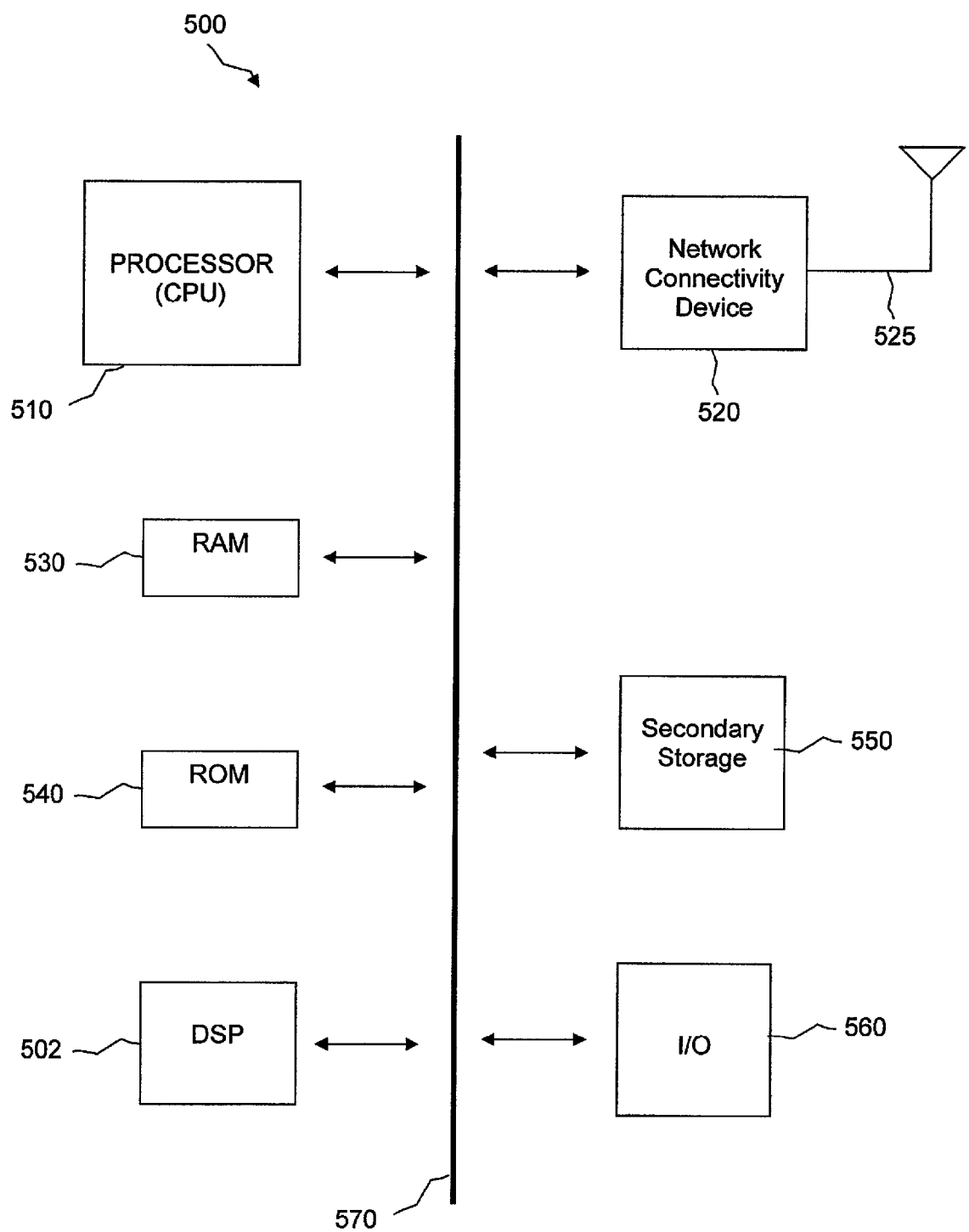
FIG. 3 illustrates a system suitable for implementing one or more embodiments disclosed herein.

The various systems and components described above might include a processing component that is capable of executing instructions related to the actions described above. FIG. 3 illustrates an example of a system 500 that includes a processing component 510 suitable for implementing one or more embodiments disclosed herein. In addition to the processor 510 (which may be referred to as a central processor unit or CPU), the system 500 might include network connectivity devices 520, random access memory (RAM) 530, read only memory (ROM) 540, secondary storage 550, and input/output (I/O) devices 560. These components might communicate with one another via a bus 570. In some cases, some of these components may not be present or may be combined in various combinations with one another or with other components not shown. These components might be located in a single physical entity or in more than one physical entity. Any actions described herein as being taken by the processor 510 might be taken by the processor 510 alone or by the processor 510 in conjunction with one or more components shown or not shown in the drawing, such as a digital signal processor (DSP) 502. Although the DSP 502 is shown as a separate component, the DSP 502 might be incorporated into the processor 510.

The processor 510 executes instructions, codes, computer programs, or scripts that it might access from the network connectivity devices 520, RAM 530, ROM 540, or secondary storage 550 (which might include various disk-based systems such as hard disk, floppy disk, SIM (subscriber identity module) card, or optical disk, or other storage device). While only one CPU 510 is shown, multiple processors may be present. Thus, while instructions may be discussed as being executed by a processor, the instructions may be executed simultaneously, serially, or otherwise by one or multiple processors. The processor 510 may be implemented as one or more CPU chips.

The network connectivity devices 520 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 520 may enable the processor 510 to communicate with the Internet or one or more telecommunications networks or other networks from which the processor 510 might receive information or to which the processor 510 might output information. The network connectivity devices 520 might also include one or more transceiver components 525 capable of transmitting and/or receiving data wirelessly.

The RAM 530 might be used to store volatile data and perhaps to store instructions that are executed by the processor 510. The ROM 540 is a non-volatile memory device that typically has a smaller memory capacity than the memory capacity of the secondary storage 550. ROM 540 might be used to store instructions and perhaps data that are read during execution of the instructions. Access to both RAM 530 and ROM 540 is typically faster than to secondary storage 550. The secondary storage 550 is typically comprised of one or more disk drives or tape drives and might be used for nonvolatile storage of data or as an over-flow data storage device if RAM 530 is not large enough to hold all working data. Secondary storage 550 may be used to store programs that are loaded into RAM 530 when such programs are selected for execution.

The I/O devices 560 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 525 might be considered to be a component of the I/O devices 560 instead of or in addition to being a component of the network connectivity devices 520.

The following 3rd Generation Partnership Project (3GPP) Technical Specifications (TS) are incorporated herein by reference including: TS23.401-8.2.0, TS23.402-8.2.0, TS 24.301.

In an embodiment, a method to promote connectivity between a user agent (UA) and a packet data network (PDN) is disclosed. The method comprises determining a quality of service class identifier (QCI) to associate with a service data flow, determining a sense of change in at least one of a priority, a packet delay budget, and a packet error loss rate of the QCI to associate with the service data flow, and sending a request to establish a service data flow treatment, the request comprising the QCI and a QCI extension encapsulating the sense of change of the QCI.

In another embodiment, a user agent (UA) to promote connectivity between the UA and a packet data network (PDN) is disclosed. The UA comprises a processor configured to determine a quality of service class identifier (QCI) to associate with a service data flow, to determine a sense of change in one of a priority, a packet delay budget, and a packet error loss rate of the QCI to associate with the service data flow, and to transmit a request to establish a service data flow treatment, the request comprising the QCI and a QCI extension encapsulating the sense of change of the QCI.

In another embodiment, a network component to promote connectivity between a user agent (UA) and a packet data network (PDN) is disclosed. The network component comprises a processor configured to receive a request to establish a service data flow, the request comprising a quality of service class identifier (QCI) and a QCI extension encapsulating a sense of change in one or a combination of a priority, a packet delay budget, and a packet error loss rate of the QCI, and to treat the service data flow based at least in part on the QCI and QCI extension.

In another embodiment, a method to promote connectivity between a user agent (UA) and a packet data network (PDN) is disclosed. The method comprises determining a quality of service class identifier (QCI) to associate with a service data flow, determining a sense of change in at least one of a priority, a packet delay budget, and a packet error loss rate designated by the QCI, the sense of change is to be associated with the service data flow. The method further comprises sending a request to establish a service data flow treatment for the service data flow, the request comprising the QCI and a QCI extension, wherein the QCI extension encapsulates the sense of change of the QCI. The QCI comprises one octet in an evolved packet system (EPS) quality of service (QoS) information element and the QCI extension comprises another octet in the EPS QoS information element.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method to promote connectivity between a user agent (UA) and a packet data network (PDN), comprising:
   determining a quality of service class identifier (QCI) associated with a service data flow, the QCI having a scalar value indicative of a current set of defined values for a set of respective QoS characteristics for the service data flow;
   determining a change from the current set of defined values for the set of respective QoS characteristics for the service data flow;
   determining a QCI extension that includes a plurality of bits, wherein a combination of values of the plurality of bits is indicative of the change; and
   sending a request to apply a service data flow treatment for the service data flow, the request comprising the QCI indicative of the current set of defined values and the QCI extension indicative of the change,
   wherein the QCI comprises four bits or more, the QCI extension comprises four bits or more, and wherein the change indicated by the QCI extension is an increase or decrease of at least one defined value of the current set for at least one respective QoS characteristic, the at least one respective QoS characteristic comprising a resource type, a priority, a packet delay budget, and a packet error loss rate,
   and wherein, when the QCI extension comprises '1111' binary, the defined value of the priority in the current set is increased by a first default value, the defined value of the packet error loss rate in the current set is increased by a second default value, and the defined value of the packet delay budget in the current set is increased by a third default value, all relative to the corresponding QoS characteristics defined by the scalar QCI.

2. A user agent (UA) to promote connectivity between the UA and a packet data network (PDN), comprising:
   a processor configured to:
   determine a quality of service class identifier (QCI) associated with a service data flow, the QCI having a scalar value indicative of a current set of defined values for a set of respective QoS characteristics for the service data flow,
   determine a change from the current set of defined values for the set of respective QoS characteristics for the service data flow, determine a QCI extension that includes a plurality of bits, wherein a combination of values of the plurality of bits is indicative of the change, and transmit a request to apply a service data flow treatment for the service flow, the request comprising the QCI indicative of the current set of defined values and the QCI extension indicative of the change, wherein the QCI comprises four bits or more, the QCI extension comprises four bits or more, and wherein the change indicated by the QCI extension is an increase or decrease of at least one defined value of the current set for at least one respective QoS characteristic, the at least one respective QoS characteristic comprising of a resource type, a priority, a packet delay budget, and a packet error loss rate to be increased and decreased, and wherein, when the QCI extension comprises '1111' binary, the value of the priority in the current set is increased by a first default value, the value of the packet error loss rate in the current set is increased by a second default value, and the value of the packet delay budget in the current set is increased by a third default value, all relative to the corresponding QoS characteristics defined by the scalar QCI.

3. A network component to promote connectivity between a user agent (UA) and a packet data network (PDN), comprising:

a processor configured to:

receive a request to establish a service data flow, the request comprising a quality of service class identifier (QCI), the QCI having a scalar value indicative of a current set of defined values for a set of respective QoS characteristics for the service flow, and a QCI extension comprising a plurality of bits, wherein a combination of values of the plurality of bits is indicative of a change to the current set of defined values for the set of respective QoS characteristics of the QCI; and treat the service data flow based at least in part on the QCI and QCI extension, wherein the processor is further configured to convert the QCI and the QCI extension to a scalar value in a range from 1 to 9 or a higher value defined in a standard version and to treat the service data flow based at least in part on the scalar value in the range from 1 to 9 or the higher value defined in the standard version, and wherein the processor is further configured to:

determine the scalar value in the range from 1 to 9 or a higher value defined in a standard version by determining a vector value composed of a priority value, a packet delay budget (PDB) value, and a packet error loss rate (PELR) value determined based on the QCI and the QCI extension and, when the QCI is associated with a guaranteed bit rate resource, determining the scalar value as the index in the following table that minimizes the least square error between the vector value and the corresponding priority value column, packet delay budget value column, and packet error loss value column

| (index) | (priority) | (PDB) | (PELR) |
|---------|-----------|-------|--------|
| 1 | 2 | 2 | 2 |
| 2 | 4 | 3 | 3 |
| 3 | 3 | 1 | 3 |
| 4 | 5 | 6 | 6 | and, when the QCI is associated with a non-guaranteed bit rate resource, determining the scalar value as the index in the following table that minimizes the least square error between the vector value and the corresponding priority value column, packet delay budget value column, and packet error loss value column

| (index) | (priority) | (PDB) | (PELR) |
|---------|-----------|-------|--------|
| 5 | 1 | 2 | 6 |
| 6 | 6 | 6 | 6 |
| 7 | 7 | 2 | 3 |
| 8 | 8 | 6 | 6 |
| 9 | 9 | 6 | 6 | wherein the index is the scalar value, the priority is the priority level, the PDB is 50 ms, and the PELR is in $10^{-1}$.

4. The network component of claim 3, wherein the processor is further configured to convert the scalar value to a legacy quality of service definition and to establish the service data flow based at least in part on the legacy quality of service definition.

* * * * *